United States Patent
Roh et al.

(10) Patent No.: US 7,485,179 B2
(45) Date of Patent: *Feb. 3, 2009

(54) INKJET COMPOSITION, INK CARTRIDGE COMPRISING THE SAME, AND INKJET RECORDING APPARATUS COMPRISING THE SAME

(75) Inventors: Hee-jung Roh, Suwon-si (KR); Seung-min Ryu, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 148 days.

This patent is subject to a terminal disclaimer.

(21) Appl. No.: 11/381,186

(22) Filed: May 2, 2006

(65) Prior Publication Data
US 2007/0002111 A1 Jan. 4, 2007

(30) Foreign Application Priority Data
Jul. 2, 2005 (KR) .............. 10-2005-0059484

(51) Int. Cl.
*C09D 11/00* (2006.01)
*C09D 11/02* (2006.01)
*B41J 2/01* (2006.01)

(52) U.S. Cl. .............. 106/31.46; 106/31.47; 106/31.49; 106/31.58; 106/31.76; 106/31.77; 106/31.78; 106/31.86; 347/100

(58) Field of Classification Search .............. 106/31.46, 106/31.47, 31.49, 31.58, 31.76, 31.77, 31.78, 106/31.86; 347/100
See application file for complete search history.

(56) References Cited

U.S. PATENT DOCUMENTS

| 5,108,503 | A | | 4/1992 | Hindagolla et al. |
| 5,145,519 | A | | 9/1992 | Kappele |
| 5,205,861 | A | * | 4/1993 | Matrick ................... 106/31.47 |
| 5,213,613 | A | * | 5/1993 | Nagashima et al. ...... 106/31.46 |
| 5,300,143 | A | * | 4/1994 | Schwarz, Jr. ............. 106/31.46 |
| 5,688,312 | A | * | 11/1997 | Sacripante et al. ....... 106/31.49 |
| 7,125,444 | B2 | * | 10/2006 | Taguchi et al. ........... 106/31.46 |
| 2005/0098063 | A1 | * | 5/2005 | Lee et al. .................. 106/31.46 |
| 2005/0268816 | A1 | * | 12/2005 | Lee et al. .................. 106/31.47 |
| 2006/0117994 | A1 | * | 6/2006 | Ryu et al. ................. 106/31.58 |

FOREIGN PATENT DOCUMENTS

| EP | 1157828 | 11/2001 |
| JP | 6-212107 | 8/1994 |
| JP | 2003-55584 | 2/2003 |
| JP | 2005-22329 | 1/2005 |

* cited by examiner

*Primary Examiner*—Helene Klemanski
(74) *Attorney, Agent, or Firm*—Stanzione & Kim, LLP

(57) ABSTRACT

An ink composition including a colorant, a cyclic amide compound, a cyclic dicarbonyl compound, and water, an ink cartridge including the same, and an inkjet recording apparatus including the same. The ink composition maintains high solubility and stability of a colorant, even when used in small amounts, thereby enhancing not only a storage stability but also a fusing property of the ink composition on a print medium, and thus reinforces a rubbing resistance of the ink composition on the print medium. The ink composition is easily dried on the print medium, and thus bleeding between colors is minimized, thereby improving printed image quality because little or solvent having a high boiling point is used in the ink composition.

33 Claims, 2 Drawing Sheets

INKJET COMPOSITION, INK CARTRIDGE COMPRISING THE SAME, AND INKJET RECORDING APPARATUS COMPRISING THE SAME

CROSS-REFERENCE TO RELATED APPLICATIONS

This application claims the benefit of Korean Patent Application No. 2005-59484, filed on Jul. 2, 2005, in the Korean Intellectual Property Office, the disclosure of which is incorporated herein in its entirety by reference.

BACKGROUND OF THE INVENTION

1. Field of the Invention

The present general inventive concept relates to an ink composition, and more particularly, to an ink composition having an improved storage stability and an increased drying speed, thereby improving printed image quality, an ink cartridge comprising the same, and an inkjet recording apparatus comprising the same.

2. Description of the Related Art

A technique for improving a storage stability of an inkjet ink composition and a property of printing on a paper using a cyclic amide compound in the inkjet ink composition was disclosed (U.S. Pat. No. 5,108,503). However, the inkjet ink composition dries at a nozzle of an inkjet head due to a lack of hygroscopicity when the cyclic amide compound is used in the inkjet ink composition.

Accordingly, a method of employing a hygroscopic solvent, such as a diol or a polyol, having a high boiling point, in an inkjet ink composition was suggested (U.S. Pat. No. 5,145,519). However, the inkjet ink composition dries slowly when the inkjet ink composition contacts a paper, and thus a cockle is induced on the paper due to the increased amount of time for which inkjet ink composition remains on the paper, and bleeding between colors becomes so severe that image quality may deteriorate. Further, adhesiveness of the inkjet ink composition to the paper is poor, and thus the rubbing resistance is weak. As a result, a printed image is smeared when the printed image is rubbed with a hand, even after the inkjet ink composition is dried.

SUMMARY OF THE INVENTION

The present general inventive concept provides an ink composition having an improved storage stability and an increased drying speed, thereby improving printed image quality, an ink cartridge comprising the same, and an inkjet recording apparatus comprising the same.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing an ink composition comprising a colorant, a cyclic amide compound, a cyclic dicarbonyl compound, and water.

The foregoing and/or other aspects and utilities of the present general inventive concept may also be achieved by providing an ink cartridge comprising the ink composition.

The foregoing and/or other aspects and utilities of the present general inventive concept may also be achieved by providing an inkjet recording apparatus including the ink cartridge comprising the ink composition.

The foregoing and/or other aspects and utilities of the present general inventive concept may also be achieved by providing an ink composition including at least one colorant, at least one cyclic amide compound, at least one cyclic dicarbonyl compound, and a liquid vehicle. The liquid vehicle may include water and at least one co-solvent.

The foregoing and/or other aspects and utilities of the present general inventive concept may also be achieved by providing a method of making an ink composition, the method including mixing a colorant, a cyclic amide compound, and a cyclic dicarbonyl compound to form a mixture, adding a liquid vehicle to the mixture, stirring the mixture containing the liquid vehicle to form a homogenous mixture, and filtering the homogenous mixture to form the ink composition.

The foregoing and/or other aspects and utilities of the present general inventive concept may also be achieved by providing a printing method, including incorporating into an inkjet printer comprising nozzles the ink composition, and ejecting droplets of the ink composition in an image-wise pattern onto a print medium. The inkjet printer may employ a thermal ink jet process in which the ink composition in the nozzles of the inkjet printer is selectively heated in the image-wise pattern, thereby causing the droplets of the ink composition to be ejected in the image-wise pattern onto the print medium. The inkjet printer may employ an acoustic ink jet process in which the droplets of the ink composition are caused to be ejected in the image-wise pattern by acoustic beams.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE PREFERRED EMBODIMENTS

Figure 1:
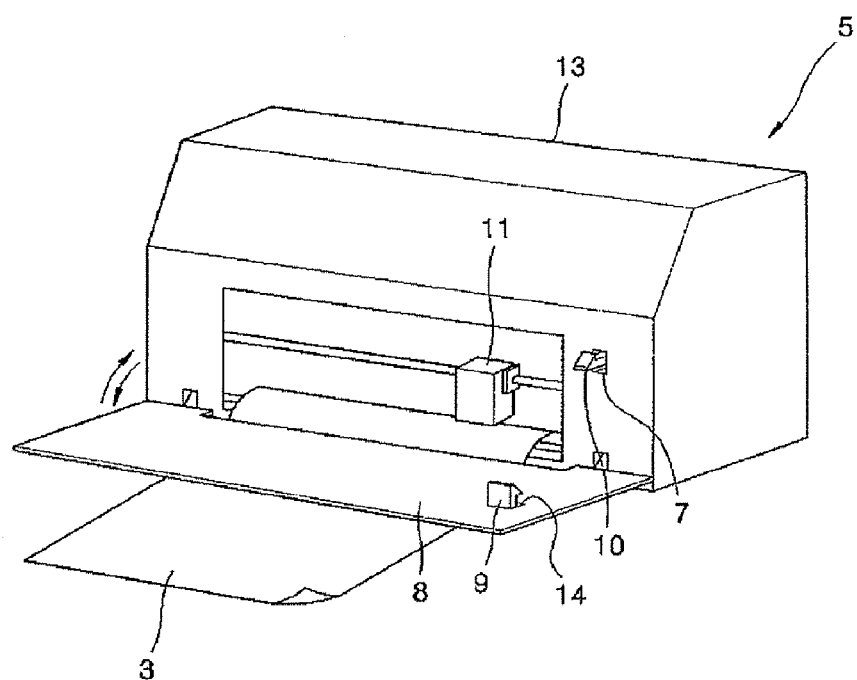
FIG. 1 is a perspective view illustrating an inkjet recording apparatus that includes an ink cartridge comprising an ink composition according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

An ink composition according to an embodiment of the present general inventive concept can enhance the solubility and stability of a colorant by comprising a cyclic amide compound, and can secure hygroscopicity by comprising a cyclic dicarbonyl compound. The combination of the cyclic amide compound and the the cyclic dicarbonyl compound prevents the ink composition from clogging and occluding a nozzle of an ink head, resulting from dried ink composition at a surface of the nozzle in the ink head. Further, a fusing property of the ink composition can be enhanced since the cyclic dicarbonyl compound has a similar structure to the cyclic amide compound, and the cyclic amide compound and the the cyclic dicarbonyl compound are therefore easily miscible in the ink composition. In addition, the cyclic dicarbonyl compound has a polarity and is capable of generating a charge, thereby reinforcing an interaction between the ink composition and an acidic group located on a print medium (such as paper) surface.

An amount of the cyclic amide compound that is used in the ink composition according to an embodiment of the present general inventive concept may be controlled to be below about 280 parts by weight by weight based on 100 parts by weight of the colorant. For example, the amount of the cyclic amide compound used in the ink composition may be in a range of about 10 to about 280 parts by weight based on 100 parts by weight of the colorant. Furthermore, the amount of the cyclic amide compound used in the ink composition may be in a range of about 10 to about 250 parts by weight based on 100 parts by weight of the colorant. If the amount of the cyclic amide compound exceeds about 280 parts by weight by weight based on 100 parts by weight of the colorant, the viscosity of the ink composition becomes so high that ejection of the ink composition may be detrimentally-affected.

An amount of the cyclic dicarbonyl compound used in the ink composition according to an embodiment of the present general inventive concept may be controlled to be below about 250 parts by weight based on 100 parts by weight of the colorant. For example, the amount of the cyclic dicarbonyl compound used in the ink composition may be in a range of about 10 to about 250 parts by weight based on 100 parts by weight of the colorant. If the amount of the cyclic dicarbonyl compound exceeds about 250 parts by weight, a speed at which the ink composition dries on the print medium, such as the paper, is slower due to an excessive amount of the cyclic dicarbonyl compound in the ink composition.

A mixing weight ratio of the cyclic amide compound to the cyclic dicarbonyl compound may be about 1:20 to about 20:1. For example, the mixing weight ratio of the cyclic amide compound to the cyclic dicarbonyl compound may be about 1:10 to about 10:1.

The cyclic amide compound used in an embodiment of the present general inventive concept may be represented by formula I below, and the cyclic dicarbonyl compound is represented by formula II below:

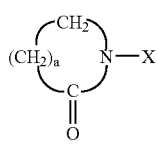

I wherein X is a hydrogen atom or a C1-C10 alkyl group, and a is an integer from 1 to 5; and

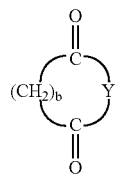

II wherein Y is —O—, —N(R)—, or —(CH$_2$)$_c$—,
R is hydrogen atom, a hydroxy group, a C1-C10 alkyl group, or a C1-C10 hydroxyalkyl group,
b is an integer from 1 to 9, and
c is an integer from 1 to 5.

Examples of compounds represented by the formula I include, but are not limited to:

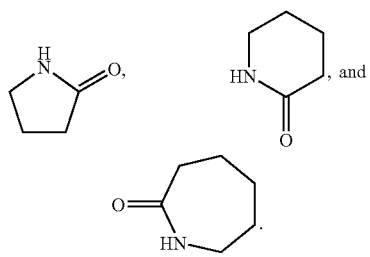

Examples of compounds represented by the formula II include, but are not limited to:

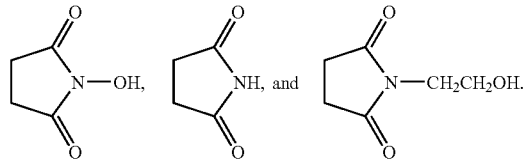

The colorant in an embodiment of the present general inventive concept may be, but is not limited to, one or more compounds selected from the group consisting of a dye, a self-dispersible pigment, a conventional dye or pigment used with a dispersant, and the like.

Examples of the colorant include, but are not limited to, Food Black dyes, Food red dyes, Food Yellow dyes, Food Blue dyes, Acid Black dyes, Acid Red dyes, Acid Blue dyes, Acid Yellow dyes, Direct Black dyes, Direct Blue dyes, Direct Yellow dyes, anthraquinone dyes, monoazo dyes, diazo dyes, phthalocyanine derivatives, and the like. Examples of the pigment include, but are not limited to, carbon black, graphite, vitreous carbon, activated charcoal, activated carbon, anthraquinone, phthalocyanine blue, phthalocyanine green, diazos, monoazos, pyranthrones, perylene, quinacridone, indigoid pigments, and the like.

An amount of water in the ink composition according to an embodiment the present general inventive concept may be about 100 to about 3,000 parts by weight based on 100 parts by weight of the colorant. If the amount of water is less than about 100 parts by weight, a density of the colorant in an aqueous ink solution is so large that the viscosity of the ink composition may become to high. If the amount exceeds about 3,000 parts by weight, the amount of the colorant is too low to realize a color easily. Although water is described as a liquid vehicle in the ink composition, the liquid vehicle is not limited to water. Thus, other suitable conventional liquid vehicles may be used instead of, or along with, water.

The ink composition according to an embodiment of the present general inventive concept can further comprise an organic solvent.

The organic solvent may be, but is not limited to, one or more compounds selected from the group consisting of an alcohol compound (such as methyl alcohol, ethyl alcohol, n-propyl alcohol, isopropyl alcohol, n-butyl alcohol, sec-butyl alcohol, t-butyl alcohol or isobutyl alcohol); a polyhydric alcohol compound (such as 1,6-hexanediol, 1,2-hexanediol, ethylene glycol, diethylene glycol, triethylene glycol, propylene glycol, butylene glycol, 1,4-butanediol, 1,2,4-butanetriol, 1,5-pentanediol, 1,2,6-hexanetriol, trimethanol propane, hexylene glycol, glycerol or poly(ethylene glycol)); a ketone compound (such as acetone, methylethyl ketone or diacetone alcohol); an ester compound (such as ethyl acetate or ethyl lactate); a lower alkyl ether compound (such as ethylene glycol monomethyl ether, ethylene glycol monoethyl ether, diethylene glycol methyl ether, diethylene glycol ethyl ether, diethylene glycol monobutyl ether, diethylene glycol diethyl ether, triethylene glycol monomethyl ether or tri ethylene glycol monoethyl ether); a sulfur-containing compound (such as dimethyl sulfoxide, tetramethylene sulfone and thioglycol); and the like, and mixtures thereof.

An amount of the organic solvent in the ink composition may be in a range of about 100 to about 2,000 parts by weight based on 100 parts by weight of the colorant. If the amount of the organic solvent is less than about 100 parts by weight, it is difficult to maintain a desired wetting effect and storage stability of the ink composition. If the amount of the organic solvent exceeds about 2,000 parts by weight, the viscosity of the ink composition is undesirably-elevated.

The ink composition according to an embodiment of the present general inventive concept can further comprise additives, such as a viscosity controller, an anti-oxidant, a pH controller, a dispersant, a surfactant, and the like, and mixtures thereof.

The ink composition according to an embodiment of the present general inventive concept may have a surface tension of about 20 to about 50 dyne/cm. Furthermore, the ink composition may have a viscosity of about 1.0 to about 10 Cp at 20° C. Further, the ink composition according to an embodiment of the present general inventive concept may have a drying time of about 0.05 to about 3 seconds with respect to a print medium. For example, the ink composition according to an embodiment of the present general inventive concept may have a drying time of about 0.1 to about 1 second with respect to a conventional sheet of paper.

Meanwhile, although its use is not particularly limited, the ink composition according to an embodiment of the present general inventive concept can be applied to a toner composition, various paints, coating liquids, and the like. The ink composition according to the present general inventive concept may be also applied to an inkjet printer cartridge that includes an array head.

A throughput of an inkjet printer including such an inkjet printer cartridge can be increased since the inkjet printer, which includes the array head, prints with high speed by employing many chips, unlike a shuttle-type inkjet printer that prints by employing a single chip.

Referring to FIG. 1, an image forming apparatus, such as an inkjet recording apparatus, according to an embodiment of the present general inventive concept includes an ink cartridge including the above-described ink composition. A printer cover 8 is connected to a main body 13 of a printer 5. An engaged region of a moving latch 10 is protruded through a hole 7. The moving latch 10 is engaged with a fixed latch 9, and the fixed latch 9 is connected to the inside of the printer cover 8 when the cover is closed. The cover 8 has a recess 14 corresponding to the engaged region of the moving latch 10, which is elongated through the hole. An ink cartridge 11 is mounted such that the ink composition is positioned on a paper 3 passing through the lower part of the ink cartridge 11.

Figure 2:
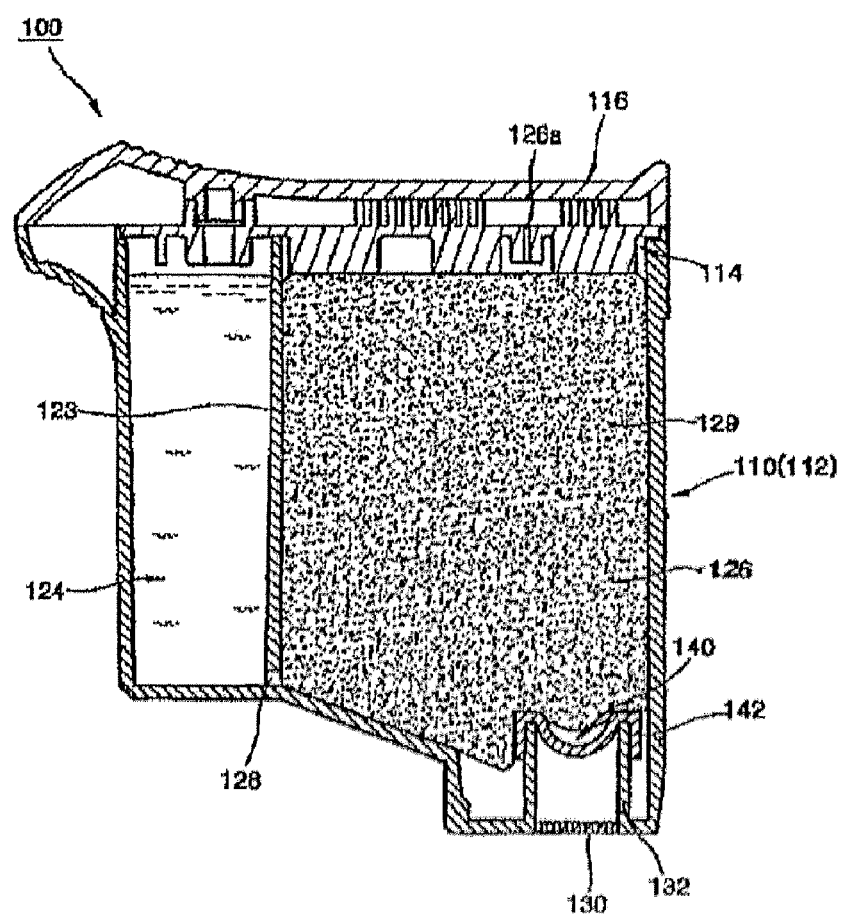
FIG. 2 is a sectional view illustrating an ink cartridge comprising an ink composition according to an embodiment of the present general inventive concept.

FIG. 2 is a sectional view illustrating an ink cartridge including the above-described ink composition according to an embodiment of the present general inventive concept. An ink cartridge 100 includes a cartridge main body 110 forming an ink receiver 112, an inner cover 114 covering the top region of the ink receiver 112, and an outer cover 116, which is spaced apart from the inner cover 114 in a determined interval and seals the ink receiver 112 and the inner cover 114.

The ink receiver 112 is compartmentalized into a first chamber 124 and a second chamber 126 by a vertical barrier wall 123. An ink passage 128 is formed on the bottom of the vertical barrier wall 123 between the first chamber 124 and the second chamber 126. Ink is charged into the first chamber 124 and a sponge 129, and ink is also charged into the second chamber 126. A vent hole 126a corresponding to the second chamber 126 is formed within the inner cover 114.

A filter 140, to prevent an ejection hole of the printer head 130 from being clogged, is located on a lower part of the second chamber 126, thereby filtering the impurities and minute bubbles. A hook 142 is formed on an edge region of the filter 140, and is coupled to a top region of a standpipe 132. Ink in the ink receiver 120 is passed through the ejection hole of the printer head 130, and is thus ejected as small droplets on a printing medium.

The ink composition according to an embodiment of the present general inventive concept may be employed in an inkjet printer that includes an array head that uses greater than or equal to 10,000 nozzles.

The present general inventive concept will be described in greater detail with reference to the following examples. The following examples are for illustrative purposes only and are not intended to limit the scope of the general inventive concept.

EXAMPLES

A colorant, a cyclic amide compound, a cyclic dicarbonyl compound and other additives were mixed in a weight ratio below, and then water was added to the mixture to make the resultant mixture 100 g. Then, the mixture was fully stirred in a stirrer for more than 30 minutes to homogeneous state. Subsequently, ink compositions were prepared by passing the mixture through a 0.45 μm filter in using a dye as a colorant, or a 0.80 μm filter in using a pigment as a colorant.

TABLE 1

| Example No. | Colorant | Cyclic amide* | Cyclic carbonyl* | Other additives |
|---|---|---|---|---|
| 1 | D.B 199 (5.0%) | 2-Py (160) | N-Hydroxysuccimide (160) | DEG (8.0%) |
| 2 | Carbon Black (4.0%) | 2-Py (140) | Glutarimide (140) | 1,5-PD (8.0%) |
| 3 | D.Y 132 (5.0%) | Caprolactam (20) | N-Hydroxysuccimide (200) | Glycerin (7%) |
| 4 | D.B 199 (5.0%) | 2-Py (200) | Glutarimide (20) | DEG-MBE (6%) |

TABLE 1-continued

| Example No. | Colorant | Cyclic amide* | Cyclic carbonyl* | Other additives |
|---|---|---|---|---|
| 5 | Carbon black (4.0%) | Caprolactam (5) | N-(2-Hydroxyethyl)succinimide (250) | 1,5-PD (9%) |
| 6 | D.Y 132 (6.0%) | 2-Py (250) | Glutarimide (5) | DEG (6%) |

*denotes that the amount in parentheses of each component is parts by weight based on 100 parts by weight of the colorant.

TABLE 2

| Comparative Example No. | Colorant | Cyclic amide* | Cyclic carbonyl* | Other additives |
|---|---|---|---|---|
| 1 | D.Y 132 (5.0%) | Delta valerolactam (160) | — | Glycerin (7.0%) |
| 2 | D.B. 199 (5.0%) | — | Glutarimide (180) | DEG (8.0%) |
| 3 | Carbon Black (4.5%) | Caprolactam (180) | — | 1,5-PD (8%) |

*denotes that the amount in parentheses of each component is parts by weight based on 100 parts by weight of a colorant.

Storage Stability of Ink 100 ml of the ink compositions prepared according to Examples 1-6 and Comparative Examples 1-3 were respectively placed into heat resistant vials, the vials were each closed, and the vials were stored in an incubator at 60° C. After storage for 2 months, the ink compositions were tested to determine whether precipitates were formed and whether layers were separated at the bottom of the vials, and the results were evaluated as follows:
O: no precipitates, no layer separation.
Δ: no precipitates, layer separation occurred.
X: precipitates occurred.
The results are illustrated in Table 3 below.

Test for Rubbing Resistance

Of the ink compositions prepared according to Examples 1-6 and Comparative Examples 1-3, color ink was refilled in an ink cartridge C-60 (Samsung Electronics Co., Ltd.), and black ink was refilled in an ink cartridge M-50 (Samsung Electronics Co., Ltd.). A character and a solid image were printed onto a conventional sheet of paper for each cartridge using an MJC-3300P Samsung printer. Resulting printed images were dried for 24 hours in the air (i.e., at room temperature). The printed images were rubbed with a hand in a 25° C. and 50% RH environment, and the results were evaluated with naked eyes as follows:
O: image was not spotted
Δ: image was slightly spotted, but the character was legible
X: image was so spotted that the character was illegible
The results are illustrated in Table 3 below.

Test for Water Resistance

Of the ink compositions prepared according to Examples 1-6 and Comparative Examples 1-3, color ink was refilled in an ink cartridge C-60 (Samsung Electronics Co., Ltd.), and black ink was refilled in an ink cartridge M-50 (Samsung Electronics Co., Ltd.). A character and a solid image were printed onto a conventional sheet of paper for each cartridge using an MJC-3300P Samsung printer. Resulting printed images were dried in the air for 24 hours (i.e., at room temperature). A change in OD values from before to after the printed images were soaked in water for 5 minutes was determined, and the results were evaluated as follows:
⊚: the OD was changed in a range of less than 10%
O: the OD was changed in a range of 10% to 20%
Δ: the OD was changed in a range of 20% to 40%
X: the OD was changed in a range of more than 40%
The results are illustrated in Table 3 below.

Test of Nozzle Occlusion

Of the ink compositions prepared according to Examples 1-6 and Comparative Examples 1-3, color ink was refilled in an ink cartridge C-60 (Samsung Electronics Co., Ltd.), and black ink was refilled in an ink cartridge M-50 (Samsung Electronics Co., Ltd.). Each cartridge was stored for 2 weeks at an ambient temperature (i.e., 25 □) and at a low temperature (i.e., −18 □). After the storage for 2 weeks, each cartridge was used in an using an MJC-3300P Samsung printer for printing. Then, after the printing, nozzles of the printer were evaluated to determine a number of nozzles that required cleaning before use for normal printing (i.e., cleaning before the nozzles could be used to print images having a desired print quality). The number of nozzles needing cleaning was determined, and the results were evaluated as follows:
⊚: normal printing was possible when cleaning nozzles one time
O: normal printing was possible when cleaning nozzles 2 to 4 times
X: normal printing was possible when cleaning nozzles 5 to 10 times
XX: normal printing was not possible even when cleaning nozzles 10 times
The results are illustrated in Table 3 below.

TABLE 3

| | Examples No. | | | | | | Comparative Examples | | |
|---|---|---|---|---|---|---|---|---|---|
| | 1 | 2 | 3 | 4 | 5 | 6 | 1 | 2 | 3 |
| Storage stability | O | O | O | O | O | O | O | X | O |
| Rubbing resistance | O | O | O | O | O | O | O | O | X |
| Water resistance | ⊚ | ⊚ | O | ⊚ | ⊚ | O | ⊚ | O | ⊚ |
| Nozzle occlusion | ⊚ | ⊚ | ⊚ | Δ | O | Δ | X | Δ | X |

An ink composition according to an embodiment of the present general inventive concept comprises both a cyclic amide compound and a cyclic dicarbonyl compound, and thus maintains high solubility and stability of a colorant, even when used in small amounts. The ink composition comprising both a cyclic amide compound and a cyclic dicarbonyl compound thereby enhances not only a storage stability, but also a fusing property of the ink composition on a print medium (such as paper), and thus reinforces a rubbing resistance of the ink composition on the print medium. Further, the ink composition is easily dried on the print medium, and thus bleeding between colors is minimized, thereby improving printed image quality because little or no solvent having a high boiling point is used in the ink composition.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An ink composition comprising a colorant, a cyclic amide compound, a cyclic dicarbonyl compound, and water.

2. The ink composition of claim 1, wherein an amount of the cyclic amide compound in the ink composition is less than about 280 parts by weight based on 100 parts by weight of the colorant.

3. The ink composition of claim 1, wherein an amount of the cyclic dicarbonyl compound in the ink composition is less than about 250 parts by weight based on 100 parts by weight of the colorant.

4. The ink composition of claim 1, wherein a mixing weight ratio of the cyclic amide compound to the cyclic dicarbonyl compound is about 1:20 to about 20:1.

5. The ink composition of claim 1, wherein the cyclic amide compound is represented by formula I:

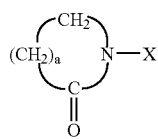

wherein X is a hydrogen atom or a C1-C10 alkyl group, and a is an integer from 1 to 5.

6. The ink composition of claim 5, wherein the cyclic amide compound of the formula I is a compound selected from the group consisting of

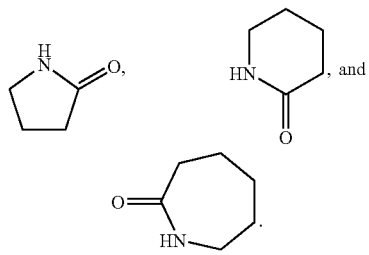

7. The ink composition of claim 1, wherein the cyclic dicarbonyl compound is represented by formula II:

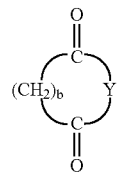

wherein Y is —O—, —N(R)—, or —(CH$_2$)$_c$—,
R is a hydrogen atom, a hydroxy group, a C1-C10 alkyl group, or a C1-C10 hydroxyalkyl group,
b is an integer from 1 to 9, and
c is an integer from 1 to 5.

8. The ink composition of claim 7, wherein the compound of the formula II is a compound selected from the group consisting of

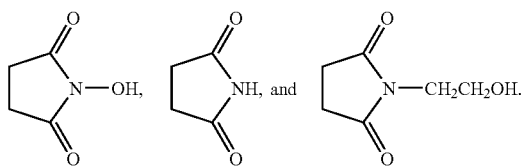

9. The ink composition of claim 1, further comprising an organic solvent.

10. The ink composition of claim 9, wherein an amount of the organic solvent in the ink composition is in a range of about 100 to about 2,000 parts by weight based on 100 parts by weight of the colorant.

11. An ink cartridge comprising the ink composition of claim 1.

12. An inkjet recording apparatus including the ink cartridge of claim 11.

13. The inkjet recording apparatus of claim 12, further comprising an inkjet printer that includes an array head including greater than or equal to 10,000 nozzles.

14. The ink composition of claim 1, wherein an amount of the cyclic amide compound in the ink composition is about 10 parts by weight to about 280 parts by weight based on 100 parts by weight of the colorant.

15. The ink composition of claim 1, wherein an amount of the cyclic dicarbonyl compound in the ink composition is about 10 parts by weight to about 250 parts by weight based on 100 parts by weight of the colorant.

16. The ink composition of claim 1, wherein a mixing weight ratio of the cyclic amide compound to the cyclic dicarbonyl compound is about 1:10 to about 10:1.

17. Ink composition, comprising:
at least one colorant;
at least one cyclic amide compound;
at least one cyclic dicarbonyl compound; and
a liquid vehicle.

18. The ink composition of claim 17, wherein the liquid vehicle comprises water and at least one co-solvent.

19. The ink composition of claim 17, wherein a surface tension of the ink composition is about 20 to about 50 dyne/cm and a viscosity of the ink composition is about 1.0 to about 10 Cp at 20° C.

20. The ink composition of claim 17, wherein an amount of the liquid vehicle in the ink composition is about 100 parts by weight to 3,000 parts by weight based on 100 parts by weight of the colorant.

21. Inkjet ink cartridge, comprising the ink composition of claim 17.

22. The inkjet ink cartridge of claim 21, further comprising:
- a first chamber;
- a second chamber;
- a vertical barrier wall located between the first and second chambers;
- an ink passage located on the vertical barrier connecting the first and second chambers; and
- a filter located on the second chamber.

23. An inkjet printer, comprising the inkjet ink cartridge of claim 21.

24. The inkjet printer of claim 23, further comprising an array head.

25. The inkjet printer of claim 24, wherein the array head comprises greater than or equal to 10,000 nozzles.

26. A method of making an ink composition, the method comprising:
- mixing a colorant, a cyclic amide compound, and a cyclic dicarbonyl compound to form a mixture;
- adding a liquid vehicle to the mixture;
- stirring the mixture containing the liquid vehicle to form a homogenous mixture; and
- filtering the homogenous mixture to form the ink composition.

27. A printing method, comprising:
- incorporating into an inkjet printer comprising nozzles the ink composition of claim 17; and
- ejecting droplets of the ink composition in an image-wise pattern onto a print medium.

28. The method of claim 27, wherein the inkjet printer employs a thermal ink jet process wherein the ink composition in the nozzles of the inkjet printer is selectively heated in the image-wise pattern, thereby causing the droplets of the ink composition to be ejected in the image-wise pattern onto the print medium.

29. The method of claim 27, wherein the inkjet printer employs an acoustic ink jet process wherein the droplets of the ink composition are caused to be ejected in the image-wise pattern by acoustic beams.

30. A toner composition, comprising the ink composition of claim 17.

31. A paint, comprising the ink composition of claim 17.

32. A coating liquid, comprising the ink composition of claim 17.

33. An ink composition comprising:
- a colorant;
- at least one cyclic amide;
- at least one cyclic dicarbonyl compound to secure a hygroscopicity of the colorant; and
- a liquid vehicle,
- wherein the at least one cyclic amide compound and the at least one cyclic dicarbonyl compound provide solubility and storage stability for the colorant.

* * * * *